United States Statutory Invention Registration [19]

[11] Reg. Number: H519

Plichta et al. [43] Published: Sep. 6, 1988

[54] CATHODE INCLUDING A NON FLUORINATED LINEAR CHAIN POLYMER AS THE BINDER, METHOD OF MAKING THE CATHODE, AND LITHIUM ELECTROCHEMICAL CELL CONTAINING THE CATHODE

[75] Inventors: Edward J. Plichta, Freehold; Mark Salomon, Fairhaven, both of N.J.

[73] Assignee: The United States of America as represented by the Secretary of the Army, Washington, D.C.

[21] Appl. No.: 749,597

[22] Filed: Jun. 27, 1985

[51] Int. Cl.[4] ..... H01M 4/62

[52] U.S. Cl. ..... 429/217; 429/194; 429/242; 141/1.1

[58] Field of Search ..... 429/217, 218, 242

[56] References Cited

U.S. PATENT DOCUMENTS

| | | | |
|---|---|---|---|
| 3,075,033 | 1/1963 | Salkind | 429/217 |
| 3,823,369 | 3/1975 | Kamenski | 429/217 X |
| 4,035,555 | 7/1977 | Murphy et al. | 429/217 X |
| 4,060,676 | 11/1977 | Dey et al. | 429/217 |
| 4,201,839 | 5/1980 | Johnson et al. | 429/194 |
| 4,320,185 | 3/1982 | Bernstein et al. | 429/217 |

*Primary Examiner*—John F. Terapane
*Assistant Examiner*—Eric Jorgensen
*Attorney, Agent, or Firm*—Sheldon Kanars; Jeremiah G. Murray; Roy E. Gordon

[57] ABSTRACT

A cathode suitable for use in a lithium electrochemical cell is made from a mixture of active cathode material, carbon, and non fluorinated linear chain polymer by a method including the steps of (A) dissolving the non fluorinated linear chain polymer in a non polar solvent at a temperature near the melting point of the polymer, (B) adding the active cathode material and carbon and evaporating the solvent, and (C) grinding the dried mixture into a fine powder and making it into a cathode by pressing the powdered mixture onto both sides of an expanded metal screen and then cutting to the desired dimensions.

The cathode can be combined with lithium as the anode and a solution of 0.8 mol $dm^{-3}$ $LiAlCl_4$ in a mixed organic solvent of 24 mass percent 4-butyrolactone in 1,2 dimethoxyethane as the electrolyte to provide a mechanically stable, relatively inexpensive lithium electrochemical cell having good cell performance.

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

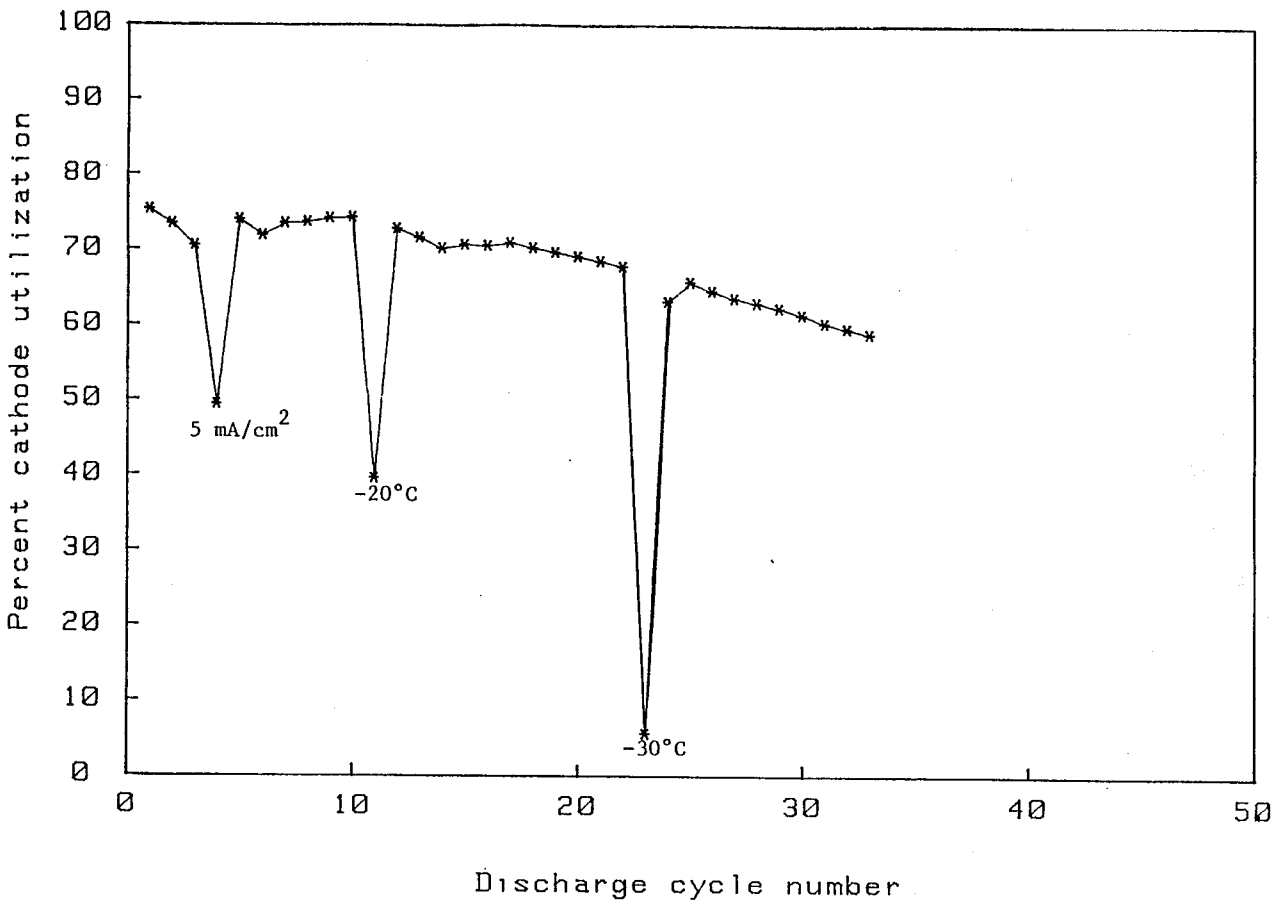
Percent cathode utilization
100
90
80
70
60
50
40
30
20
10
0
0
10
20
30
40
50
Discharge cycle number
5 mA/cm2
-20°C
-30°C

CATHODE INCLUDING A NON FLUORINATED LINEAR CHAIN POLYMER AS THE BINDER, METHOD OF MAKING THE CATHODE, AND LITHIUM ELECTROCHEMICAL CELL CONTAINING THE CATHODE

The invention described herein may be manufactured, used, and licensed by or for the Government for governmental purposes without the payment to us of any royalty thereon.

This invention relates to a cathode including a non fluorinated linear chain polymer as the binder, to a method of making the cathode, and to a lithium electrochemical cell containing the cathode.

BACKGROUND OF THE INVENTION

Existing technology for the fabrication of cathodes for use in lithium primary and secondary cells utilizes Teflon as the binding material. Teflon or polytetrafluoroethylene is expensive although inert, and its use results in cathode structures of poor mechanical stability. These problems do not easily lend themselves to the large scale production of cathodes in manufacturing.

SUMMARY OF THE INVENTION

Tha general object of the invention is to provide a cathode suitable for use in lithium electrochemical cells. Another object of the invention is to provide such a cathode that will be mechanically stable and relatively inexpensive to manufacture. A further object of the invention is to provide such a cathode that will be suitable for use in a primary or secondary lithium cell.

It has now been found that the aforementioned objects can be attained by replacing the Teflon binder with a non fluorinated linear chain polymer such as polypropylene (PP) or polyethylene (PE).

More particularly, according to the invention, a cathode for use in lithium primary or secondary cells can be prepared from a mixture of active cathode material, conductive dilutant such as carbon and non fluorinated linear chain polymer. The amount of carbon can be varied depending upon the resistivity of the cathode material and desired porosity of the final cathode structure. Typical cathode materials that can be used are metal halides, oxides and sulfides. The polymer is first dissolved in a non polar solvent such as Decalin (Decahydronaphthalene) or tetrachloroethylene at a temperature near the melting point of the polymer (100° to 150° C.). The active cathode material and carbon are added and the solvent evaporated.

DESCRIPTION OF THE PREFERRED EMBODIMENT

The following is a preparation of a cathode structure utilizing $TiS_2$ as the active cathode material. The procedure is performed in an argon filled dry box. Polypropylene powder is dissolved near its crystalline melting temperature of about 100° to 120° C. in a small volume of decahydronaphthalene of about 5 mls decahydronaphthalene for about 0.1 to 0.2 gm (PP), the solution being stirred continuously during heating. Once the (PP) is dissolved, the solution is removed from the heat and cooled below 100° C. and the active cathode material and carbon powders are then added quickly before the polymer solution cools completely. The powdered materials and solutions are stirred vigorously by hand until the solution is absorbed and the mix becomes granular and has cooled to room temperaiure. The mixture is then dried in a vacuum oven at about 120° to 150° C. for 12 hours in order to remove the decahydronaphthalene. The dried mixture is then ground into a fine powder and made into cathodes by pressing the powdered mixture onto both sides of an expanded metal screen and then cut to desired dimensions.

Although flat plate type electrodes have been prepared in the foregoing embodiment to demonstrate the use of the non fluorinated linear chain polymers as binding materials, the method results in moderately flexible structures which makes the method equally adaptable to the preparation of rolled electrodes, either cold-rolled or rolled through heated rollers using a powdered mix or a slurry mixture using a non reactive organic solvent.

The Table shows typical results for a Li-$TiS_2$ cell in which cell performance is studied as a function of solvent composition, cathode composition, and cathode preparation, that is, cold-pressing or hot-pressing. Performance is found to be equal to that obtained from cells utilizing cathodes of poor mechanical properties, that is, based on teflon binders. The Table shows that one can operate with a wide range of (PP) content in the electrode. More specifically, one can use less binder and still obtain a good mechanically stable cathode. In fact, one can go down to as little as 1 to 3 weight percent of binder which allows one to put in more active cathode material and improve the performance of the cell.

TABLE

Performance Data for Li—$TiS_2$ Cells Utilizing Polypropylene (PP) as the Cathode Binder[a].

| Electrode Type[b] | t/oc | Electrolyte | Mass % $TiS_2$ | Mass % Carbon | Mass % PP | Current Density: mA/cm$^2$ | Cathode Efficiency |
|---|---|---|---|---|---|---|---|
| cold-pressed | 25 | 0.8 mol dm$^{-3}$ | | | | 5.0 | 49.3 |
| | 25 | $LiAlCl_4$ | 80 | 10 | 10 | 2.0 | 75.2 |
| | −20 | in | | | | 2.0 | 39.5 |
| | −30 | 24% 4-BL/DME | | | | 2.0 | 5.6 |
| cold-pressed | 25 | 1.6 mol dm$^{-3}$ | 78.5 | 10 | 11.5 | 2.0 | 66.7 |
| | 25 | $LiAsF_6$ in 2Me-THF | | | | 1.0 | 82.0 |
| cold-pressed | 25 | 1.3 mol dm$^{-3}$ $LiAsF_6$ in 2Me-THF | 83.3 | 9.6 | 7.1 | 1.0 | 71.1 |
| cold-pressed | 25 | 1.6 mol dm$^{-3}$ $LiAsF_6$ in 2Me-THF | 81.8 | 12.7 | 5.5 | 2.0 | 69.5 |
| cold-pressed | 25 | 1.2 mol dm$^{-3}$ $LiAsF_6$ in 2Me-THF | 87.3 | 10.0 | 2.7 | 1.0 | 80.2 |
| cold-pressed | 25 | 0.85 mol dm$^{-3}$ | 79.7 | 10.1 | 10.2 | 2.0 | 68.9 |

TABLE-continued

| Electrode Type[b] | t/oc | Electrolyte | Mass % $TiS_2$ | Mass % Carbon | Mass % PP | Current Density: mA/cm$^2$ | Cathode Efficiency |
|---|---|---|---|---|---|---|---|
| | | Performance Data for Li—$TiS_2$ Cells Utilizing Polypropylene (PP) as the Cathode Binder[a]. | | | | | |
| | | $LiAlCl_4$ in 24% 4-BL/DME | | | | | |

[a]2Me-THF is 2-methyl tetrahydrofuran
DME is 1,2-dimethoxyethane
4-BL is 4-butyrolactone
[b]Cathode porosity in the range of 40–60%

DESCRIPTION OF THE DRAWING

The drawing illustrates a cycling profile for a rechargeable lithium cell using a $TiS_2$ cathode and an electrolyte consisting of 0.8 mol dm$^{-3}$ $LiAlCl_4$ in a mixed organic solvent of 24 mass percent 4-butyrolactone in 1,2 dimethoxyethane (24% 4-BL in DME). The cathode (80 mass % $TiS_2$, 10 mass % carbon and 10 mass % (PP) is prepared as described in the description of the preferred embodimant.

Referring to the drawing, the cell used for the drawing is cycled at 25° C. at a current density of 2.0 mA cm$^{-2}$, and excursions are shown for discharges at 5.0 mAcm$^{-2}$ and at 2.0 mAcm$^{-2}$ at lower temperatures of 20° C. and −30° C. Cycling is stopped after 33 cycles. The drawing also shows that after excursions to higher current densities and/or lower temperatures, cell performance recovers exceptionally well. In the drawing, the ordinate, percent cathode utilization, is an indicator as to how the cell is performing.

Any non fluorinated linear chain polymer can be used in the cathode that is stable in the electrolyte of the lithium cell. The linear chain polymers are inert in a wide variety of non aqueous solvents including ethers and lactones. Suitable polymers include (PP) and (PE).

Active cathode materials that can be used include metal halides, metal oxides, and metal sulfides of which $TiS_2$ is preferred. Pure carbon can be used for those cells in which the solvent serves as the depolarizer.

Any carbon black can be used as the carbon for the cathode that enhances the conductivity of the electrodes. The particular carbon black used in the description of the preferred embodiment is Shawinigan Black but other high surface area carbons or graphite can also be used. The invention even contemplates a cathode made from a mixture of polymer and active cathode material with no carbon present.

The electrolyte used in the lithium cell must be compatible with the cathodes made according to the invention. Suitable electrolytes include a solution of an inorganic lithium salt in a pure or mixed organic solvent.

In the method of the invention, mechanically stable structures can be easily prepared by cold-pressing or cold rolling, and by hot-pressing or hot-rolling. Moreover, sintering temperatures below 170° C. should be used since some cathode materials are subject to decomposition above 200° C.

Thus, it has been demonstrated that non fluorinatad linear chain polymers such as (PP) or (PE) can be used to prepare mechanically stable cathodes for nonaqueous lithium cells. The use of the non fluorinated linear chain polymers as binders results in low cost cathodes giving equal electrochemical performance as do Teflon bonded cathodes, but the use of the non fluorinated linear chain polymers results in cathodes having great mechanical stability that can be fabricated in several forms such as plates or rolls, and that can be made as thin as 0.5 mm or less.

We wish it to be understood that we do not desire to be limited to the exact details as described for obvious modifications will occur to a person skilled in the art.

What is claimed is:

1. A cathode for use in lithium electrochemical cells, said cathode comprising a mixture of about 75 to 90 mass percent $TiS_2$, about 10 mass percent carbon, and about 2 to 10 mass percent of polypropylene pressed onto both sides of an expanded metal screen.

2. A lithium electrochemical cell comprising lithium as the anode, a solution of 0.8 mol dm$^{-3}$ $LiAlCl_4$ in a mixed organic solvent of 24 mass percent 4-butyrolactone in 1,2 dimethoxyethane as the electrolyte, and a mixture of about 75 to 90 mass percent $TiS_2$, about 10 mass percent carbon and about 2 to 10 percent of polypropylene pressed onto both sides of an expanded metal screen as the cathode.

3. Method of preparing a cathode for use in a lithium electrochemical cell from a mixture of $TiS_2$, carbon and polypropylene, said method including the steps of:

(A) dissolving polypropylene by heating at 100° to 130° C. in a volume of decahydronaphthalene to obtain a polymer solution that is contained in an argon filled dry box while stirring the solution continuously during heating;

(B) removing the solution from the heat, cooling to below 100° C., and quickly adding powdered materials formed from the carbon and $TiS_2$ before the polymer solution cools completely;

(C) stirring a mix of the powdered materials and solution vigorously until the solution is absorbed and the mix becomes granular and has cooled to room temperature to form a mixture;

(D) drying the mixture in a vacuum oven at 120° C. to 150° C. for 12 hours in order to remove the decahydronaphthalene and form a dried mixture; and (E) grinding the dried mixture into a fine powder to form a powdered mixture and making into a cathode by pressing the powdered mixture onto both sides of an expanded metal screen.

4. Method of preparing a cathode for use in a lithium electrochemical cell from a mixture of active cathode material, carbon, and non fluorinated linear chain polymer, said method inducing the steps of:

(A) dissolving the non fluorinated linear chain polymer in a non polar solvent at a temperature near the melting point of the polymer;

(B) cooling slightly and adding the active cathode material and carbon and evaporating the solvent to obtain a dried mixture; and (C) grinding the dried mixture into a fine powder and making it into a cathode by pressing the powder mixture onto both sides of an expanded metal screen.

5. Method according to claim 4 wherein the active cathode material is selected from the group consisting of metal halides, metal oxides, and metal sulfides.

6. Method according to claim 5 wherein the active cathode material is $TiS_2$.

7. Method according to claim 4 wherein the non fluorinated linear chain polymer is selected from the group consisting of polypropylene and polyethylene.

8. Method according to claim 7 wherein the non-fluorinated linear chain polymer is polypropylene.

9. Method according to claim 7 wherein the non-fluorinated linear chain polymer is polyethylene.

* * * * *